June 13, 1950     H. R. GIBBONS     2,511,706

METHOD OF PRODUCING BEARING RINGS

Filed June 16, 1945

INVENTOR:
Harold R. Gibbons
BY Romeyn A Spare
HIS ATTORNEY.

Patented June 13, 1950

2,511,706

UNITED STATES PATENT OFFICE 2,511,706

METHOD OF PRODUCING BEARING RINGS

Harold R. Gibbons, Chatham, N. J., assignor to General Motors Corporation, Detroit, Mich., a corporation of Delaware Application June 16, 1945, Serial No. 599,871

1 Claim. (Cl. 29—149.5)

This invention relates to antifriction bearing race rings and its primary object is to produce an inner race ring of high carbon steel which will withstand a heavy press fit on a shaft without splitting or cracking.

In the drawings

Figure 1:
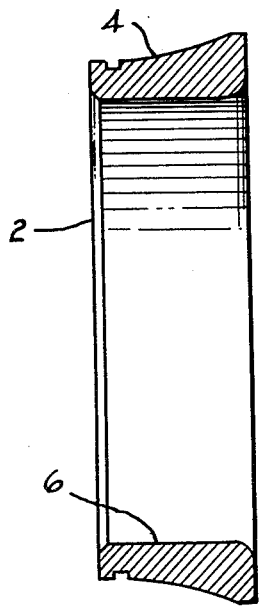
Fig. 1 is a sectional view taken axially of a roller bearing race ring.

In Fig. 1 is shown a race ring 2 having a curved raceway 4 for cooperation with rollers of a barrel roller bearing but the invention is applicable to bearing race rings generally. Such race rings have a cylindrical bore 6 for mounting on a shaft 8. They are commonly made either of low carbon, case hardened steel or of through-hardening high carbon steel.

Figure 2:
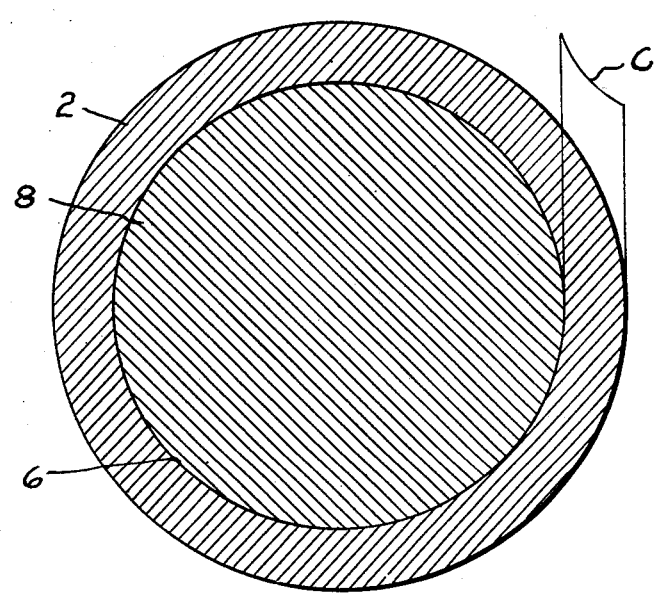
Fig. 2 is a cross sectional view of the race ring press-fitted on a shaft.
Figure 3:
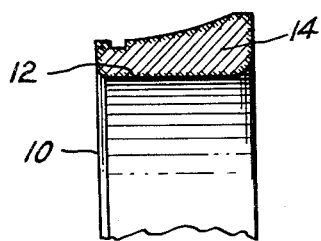
Figs. 3, 4 and 5 are diagrammatic sections of race rings of different characteristics.

In Fig. 3, the ring 10 is of low carbon steel with case hardening indicated at 12 by the shading. Such a ring may be mounted on the shaft 8 with a heavy press fit so that a clamping nut or other securing means is unnecessary. High hoop stresses are induced by the press fit but the ring will withstand them because of the tough and ductile core 14 of the low carbon steel. Hoop tension increases from the outside diameter to the bore as indicated by the curve C in Fig. 2.

Figure 4:
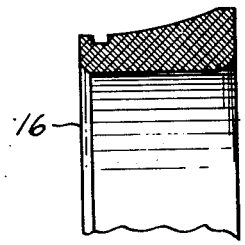

If a through hardened, high carbon race ring, such as indicated at 16 in Fig. 4, be mounted on a shaft with a heavy press fit, the high hoop stresses at the bore are liable to crack the race ring or induce a crack because of the brittle nature of the metal. Hence heavy press fits for such rings are precluded and other securing means is necessary for such rings or has been considered essential.

Figure 5:
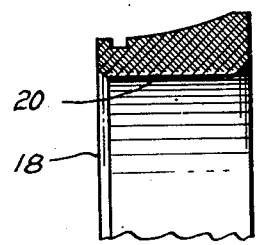

According to my invention, the race ring 18 of Fig. 5 is made of high carbon, through-hardening steel, hardened and tempered throughout, followed by a superimposed or second tempering upon its bore portion only as indicated by shading at 20, leaving the greater portion or thicker section of the ring substantially unaffected. The second tempering is of course at a higher temperature than the first one applied to the through-hardened ring. The last tempered area or thinner section extends outwardly from the bore for a relatively small proportion of the ring thickness and directly joins the thicker section without any abrupt line of demarkation or interposed annealed or third layer which is a fertile source of spalling or exfoliation in the use of hardened articles. Instead, the thinner section is softened and made more ductile by tempering and becomes less soft in an outward direction from the bore until it joins, and attains the hardness of, the thicker body section. This tempering is conveniently accomplished by induction heat treatment which quickly heats only the bore portion. The ring is then allowed to cool or, if thin in section, it may be cooled by a spray to retard heat conduction into the body of the ring. A suitable steel is A. S. M. E. 52100 which is good and clean and readily available. By the use of this steel treated as above, slow carburizing treatment of low carbon steel is avoided yet the body of the race ring retains a hardness of about 57 to 64 Rockwell C while its bore is rendered soft and ductile to withstand a heavy press fit without cracking.

I claim:

The method of producing an inner race ring for antifriction bearings and mounting it on a shaft which consists in making the ring of high carbon, through-hardening steel, hardening and tempering the entire ring, giving the bore portion of the ring a superimposed or second tempering at a higher temperature than the first temperature to render it softer and more ductile than the major portion of the body, and press-fitting the soft and ductile bore portion on a shaft.

HAROLD R. GIBBONS.

REFERENCES CITED

The following references are of record in the file of this patent:

UNITED STATES PATENTS

| Number | Name | Date |
|---|---|---|
| 1,703,232 | Gray | Feb. 26, 1929 |
| 2,145,864 | Deneen | Feb. 7, 1939 |
| 2,259,324 | Robinson | Oct. 14, 1941 |
| 2,281,332 | Somes | Apr. 28, 1942 |
| 2,368,007 | Delahan | Jan. 23, 1945 |